United States Patent [19]

Soules

[11] Patent Number: 5,468,054
[45] Date of Patent: Nov. 21, 1995

[54] PIVOTING TRAILER ASSEMBLY

[76] Inventor: Richard F. Soules, R.D. #2, Box 114, Eldred, Pa. 16731

[21] Appl. No.: 160,265

[22] Filed: Jan. 27, 1994

[51] Int. Cl.$^6$ ........................................................ B60P 1/14
[52] U.S. Cl. .......................................... 298/19 V; 254/326
[58] Field of Search ............................... 298/19 V, 21 V, 298/22 B, 22 F, 22 J; 254/325, 326, 327, 334, 335

[56]         References Cited

U.S. PATENT DOCUMENTS

| 1,294,173 | 2/1919 | Rose ..................................... 298/19 V |
| 4,062,592 | 12/1977 | Ordoñez ............................... 298/22 B |
| 4,418,959 | 12/1983 | Dunlap .............................. 298/22 F X |

*Primary Examiner*—Michael S. Huppert
*Assistant Examiner*—Janice L. Krizek

[57]            ABSTRACT

A trailer assembly adapted to pivot with respect to the horizontal comprising a trailer frame, the trailer frame adapted to be connected to a towing vehicle; a trailer bed, the rearward end of the trailer bed being pivotally connected to the rearward end of the trailer frame; a lifting ramp coupled to the trailer frame, the lifting ramp extending along the trailer frame, from the upper portion and forward end of the trailer frame to below the lower portion and rearward end of the trailer frame; a lifting assembly including a lifting arm, a pivotal connection assembly connecting the upper end of the arm and the lower surface of the trailer bed at its forward end, a wheel connected to the lower end of the lifting arm, the wheel adapted to ride along the upper surface of the lifting ramp, a pulley arm coupled to the lower end of the lifting arm with a pulley connected to the forward end of the pulley arm; a cord having an end anchored to the forward end of the lifting ramp, the pulley adapted to ride along the length of cord intermediate its ends; and a winch assembly positioned at the forward end of the trailer frame, the winch assembly having a spool with a first end with a first peripheral edge and a second end with a second peripheral edge, the second end of the length of cord coupled to the spool.

4 Claims, 4 Drawing Sheets

FIG. 7
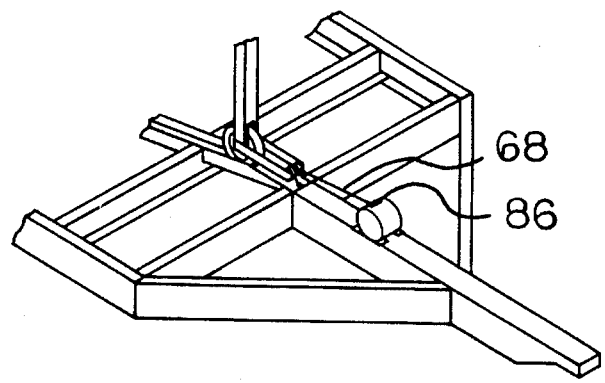
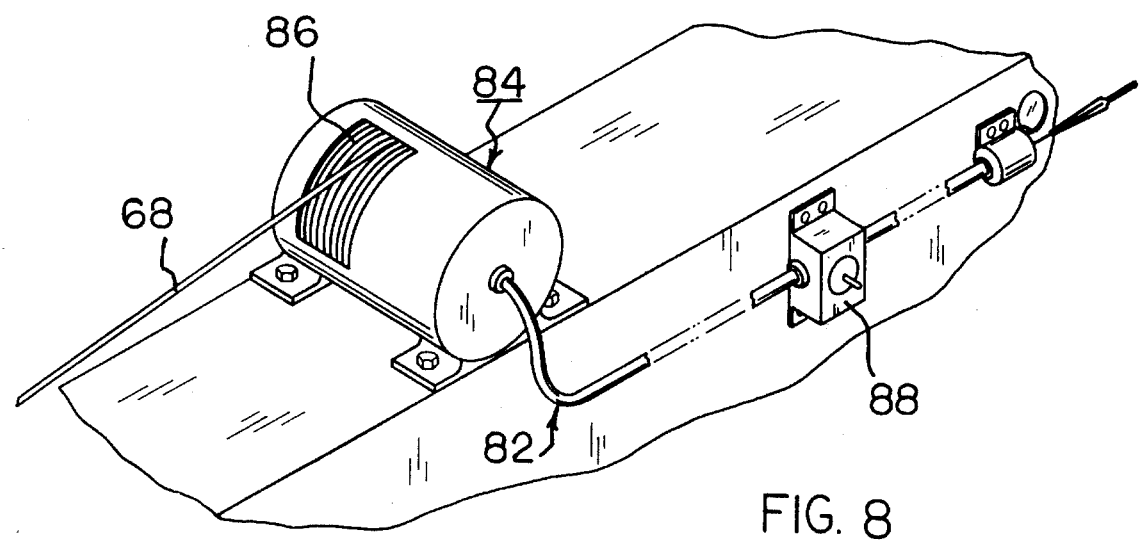
FIG. 8

PIVOTING TRAILER ASSEMBLY

BACKGROUND OF THE INVENTION

1. Field of the Invention

The present invention relates to a pivoting trailer assembly and more particularly pertains to a lifting device for the bed of a trailer that can be easily operated by hand.

2. Description of the Prior Art

The use of trailers is known in the prior art. More specifically, trailers which include pivotable trailer beds are known to consist basically of familiar, expected and obvious structural configurations, notwithstanding the myriad of designs encompassed by the crowded prior art which have been developed for the fulfillment of countless objectives and requirements.

For example, U.S. Pat. No. 3,620,397 to Gagnon discloses a single axle vehicle trailer. The trailer includes a platform that can be titled for loading or unloading without disconnection from the hitch.

U.S. Pat. No. 4,494,797 to Carberry discloses a trailer for use in supporting machines. The trailer includes a frame supported for pivotal movement about the axis of the trailer axle such that the rearward end of the trailer can move towards the ground.

U.S. Pat. No. 4,930,799 to Pihlstrom et al, disclose a tiltable trailer for motor vehicles. The tiltable trailer includes a winch for hauling a basic frame element up onto an inclined frame element.

U.S. Pat. No. 4,054,218 to Mackey discloses a trailer for livestock and other loads. The trailer includes wheels which are swingable forwardly about pivots.

Finally, U.S. Pat. No. 4,568,235 to Bills, Jr. discloses a low angle tilt trailer. The trailer includes a forward frame section and a rear frame section selectively longitudinally slidably mounted thereon.

While these trailers fulfill their respective, particular objectives and requirements, the aforementioned patents do not describe a trailer assembly which includes a bed lifting device having a pivotable arm. Furthermore, the aforementioned patents do not describe a bed lifting device having a pivotable arm operated by way of a winch assembly.

In this respect, the lifting device according to the present invention substantially departs from the conventional concepts and designs of the prior art, and in so doing provides an apparatus primarily developed for enabling an individual operator to pivot a trailer bed relative to a trailer frame by way of a winch assembly.

Therefore, it can be appreciated that there exists a continuing need for a new and improved pivoting trailer assembly to facilitate loading and unloading by reliable, efficient, convenient, inexpensive pivoting mechanisms.

SUMMARY OF THE INVENTION

In view of the foregoing disadvantages inherent in the known types of trailers now present in the prior art, the present invention provides an improved pivoting trailer assembly. As such, the general purpose of the present invention, which will be described subsequently in greater detail, is to provide a new and improved pivoting trailer assembly apparatus and method which has all the advantages of the prior art and none of the disadvantages.

To attain this, the present invention essentially comprises a trailer assembly adapted to pivot with respect to the horizontal assembly comprising, in combination, a trailer frame having a forward end, a rearward end, an upper portion, a lower portion, and a central region; a trailer bed having a forward end, an upper surface, and a lower surface, the rearward end of the trailer bed being pivotally connected to the rearward end of the trailer frame; a lifting ramp having a forward end, a rearward end, an upper surface and a lower surface, the lifting ramp being connected with the trailer frame, the lifting ramp extending along the central region of the trailer frame from the upper portion and forward end of the trailer frame to below the lower portion and rearward end of the trailer frame; a lifting assembly including a lifting arm, the lifting arm having an upper end and a lower end, a pivotal connection assembly connecting the upper end of the arm and the lower surface of the trailer bed at its forward end, a wheel connected to the lower end of the lifting arm, the wheel adapted to ride along the upper surface of the lifting ramp, a pulley arm having a forward end and a rearward end, the pulley arm connected to the lower end of the lifting arm, a pulley connected to the forward end of the pulley arm; the pivotal connection assembly including a u-shaped bracket having two sides, an upper closed end, and a lower opened end, the upper closed end of the U-shaped bracket connected to the lower surface and forward end of the trailer bed, an aperture formed through the two sides of the U-shaped bracket, a bushing positioned within the aperture of the U-shaped bracket, the upper end of the lifting arm being connected to the bushing, a rod having a first end and a second end, the rod positioned through the aperture of the U-shaped bracket and the bushing, the rod serving to pivotally connect the upper end of the lifting arm to the U-shaped bracket, a series of ball bearings positioned about each end of the rod, the ball bearings to aid the pivotal connection between the lifting arm and U-shaped bracket; a length of cord having a first end and a second end, the first end being anchored to the forward end of the lifting ramp, the pulley adapted to ride along the length of cord intermediate the first and second ends; a winch assembly positioned at the forward end of the trailer frame, the winch assembly having a spool, the spool having a first end with a first peripheral edge and a second end with a second peripheral edge, a set of saw teeth positioned about at least one of the peripheral edges of the spool, a driving gear connected to an end of the spool adjacent the set of saw teeth, the winch assembly further including a latch with a spring biasing the latch into a first position in engagement with the set of saw teeth, the latch having a second position in disengagement from the set of teeth, a first handle means serving to rotate the driving gear and spool, a second handle means serving to position the spring biased latch in one of its two positions, when the spring biased latch is in the first position rotation of the spool pulls the pulley and lifting arm to the forward portion of the lifting ramp.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pivoting trailer assembly which has all the advantages of the prior art trailers and none of the disadvantages.

It is another object of the present invention to provide a new and improved pivoting trailer assembly which may be easily and efficiently manufactured and marketed.

It is a further object of the present invention to provide a new and improved pivoting trailer assembly which is of a durable and reliable construction.

An even further object of the present invention is to provide a new and improved pivoting trailer assembly which is susceptible of a low cost of manufacture with regard to both materials and labor, and which accordingly is then susceptible of low prices of sale to the consuming public, thereby making such pivoting trailer assemblies economically available to the buying public.

Still yet another object of the present invention is to provide a new and improved pivoting trailer assembly which provides in the apparatuses and methods of the prior art some of the advantages thereof, while simultaneously overcoming some of the disadvantages normally associated therewith.

Still another object of the present invention is to provide a new and improved pivoting trailer assembly which employs a winch mechanism to enable a sale operator to pivot the trailer.

Yet another object of the present invention is to provide a new and improved pivoting trailer assembly which employs a pulley system to reduce the faces needed in the pivoting of the transfer.

Even still another object of the present invention is to provide a new and improved pivoting trailer assembly which can employ power transferred from the towing vehicle to the winch assembly.

Lastly, it is an object of the present invention to provide a trailer assembly adapted to pivot with respect to the horizontal comprising a trailer frame, the trailer frame adapted to be connected to a towing vehicle; a trailer bed, the rearward end of the trailer bed being pivotally connected to the rearward end of the trailer frame; a lifting ramp coupled to the trailer frame, the lifting ramp extending along the trailer frame from the upper portion and forward end of the trailer frame to below the lower portion and rearward end of the trailer frame; a lifting assembly including a lifting arm, a pivotal connection assembly connecting the upper end of the arm and the lower surface of the trailer bed at its forward end, a wheel connected to the lower end of the lifting arm, the wheel adapted to the ride along the upper surface of the lifting ramp, a pulley arm coupled to the lower end of the lifting arm with a pulley connected to the forward end of the pulley arm; a cord having an end anchored to the forward end of the lifting ramp, the pulley adapted to ride along the length of cord intermediate its ends; and a winch assembly positioned at the forward end of the trailer frame, the winch assembly having a spool with a first end with a first peripheral edge and a second end with a second peripheral edge, the second end of the length of cord coupled to the spool.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a view of a portion of the trailer frame constructed in accordance with the second embodiment of the present invention.

FIG. 8 is a view of the winch assembly in accordance with the second embodiment of the present invention.

DESCRIPTION OF THE PREFERRED EMBODIMENT

Figure 1:
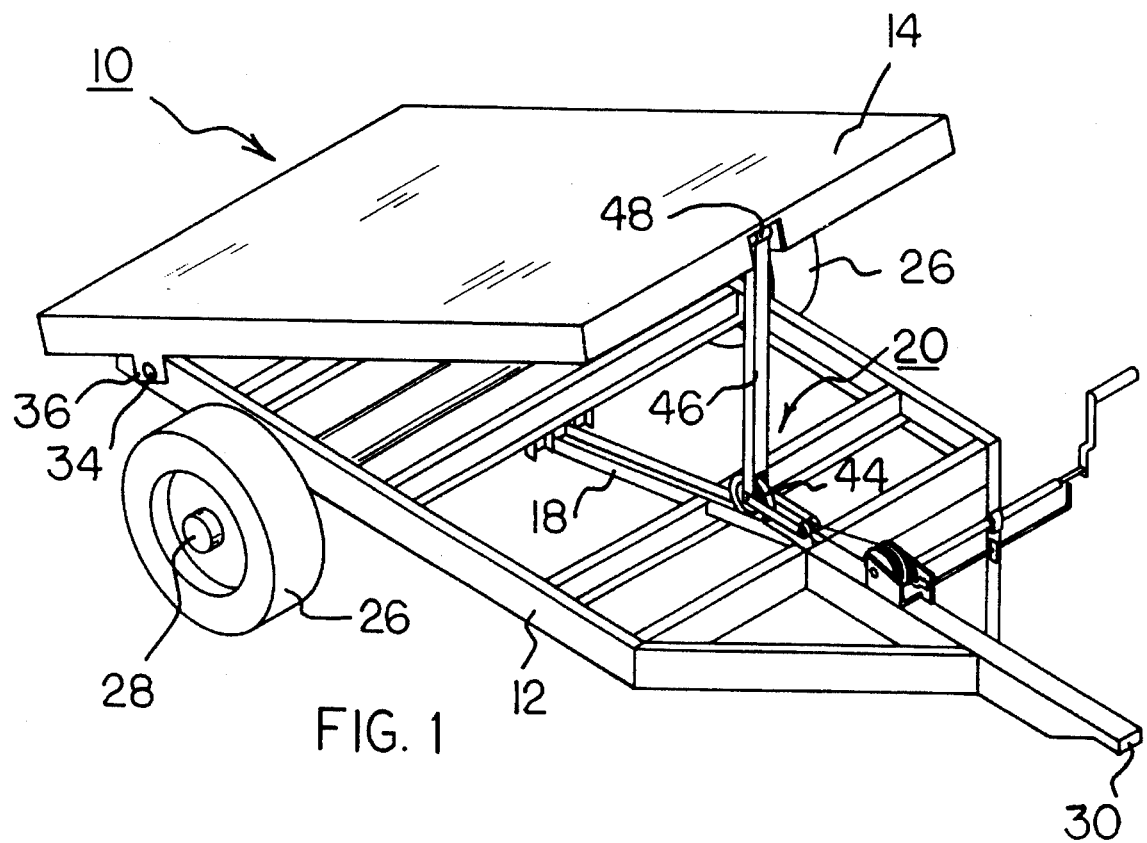
FIG. 1 is a perspective view of the first embodiment of a pivoting trailer assembly constructed in accordance with the principals of the present invention.
Figure 2:
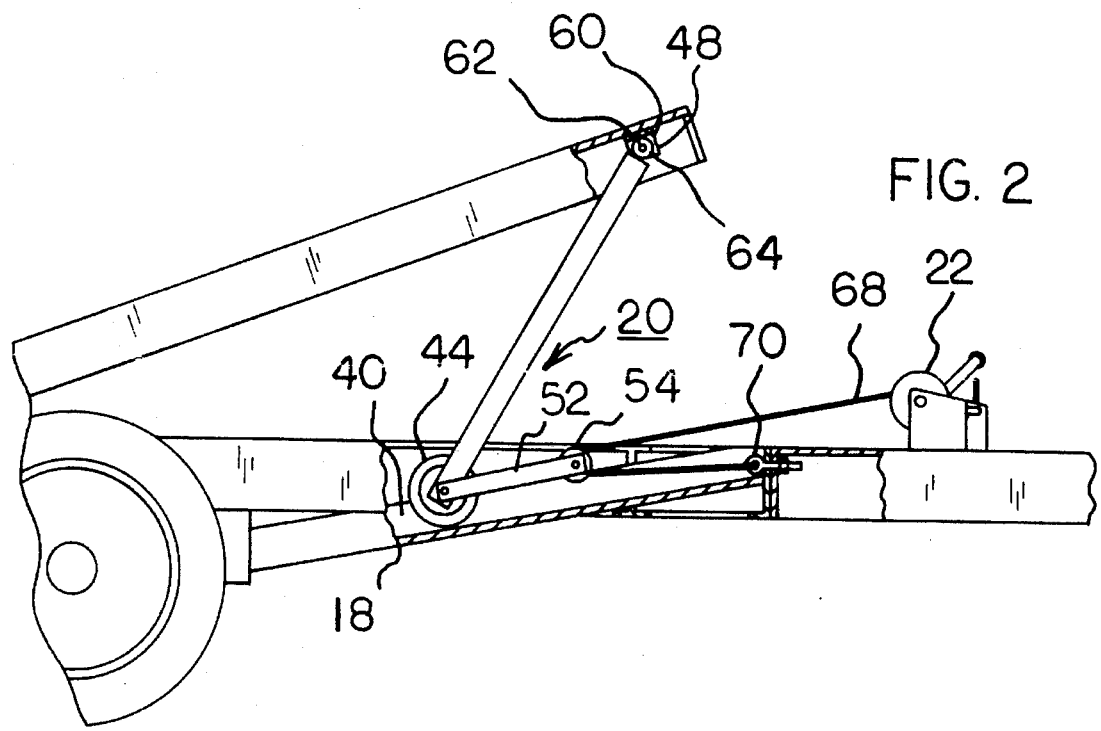
FIG. 2 is a side elevational view partially in sectional of the first embodiment of the present invention.
Figure 3:
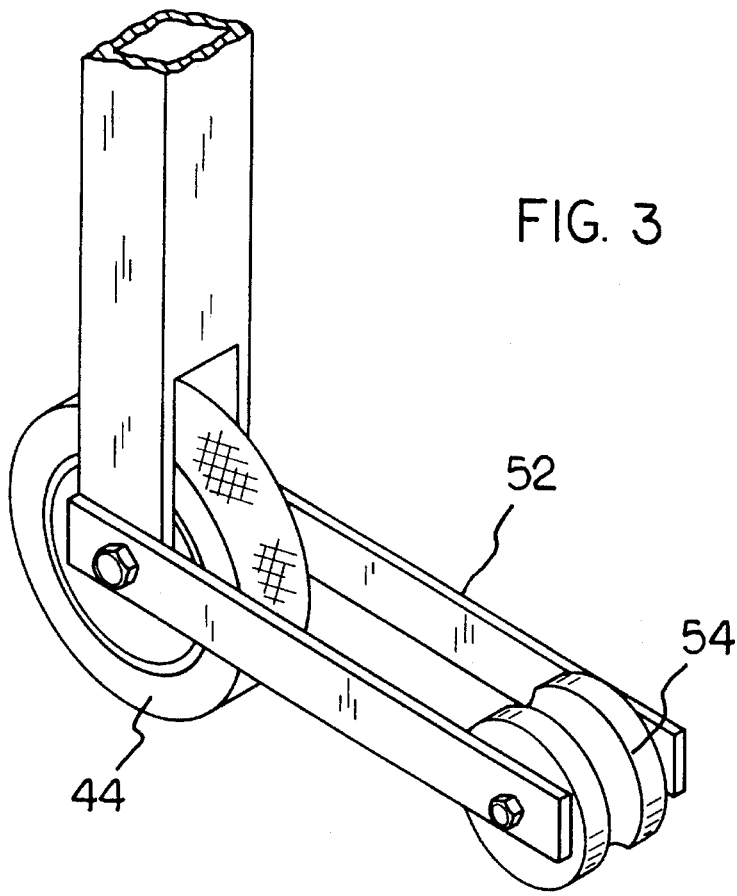
FIG. 3 is an enlarged perspective view illustrating the lower end of the lifting arm of the present invention.
Figure 4:
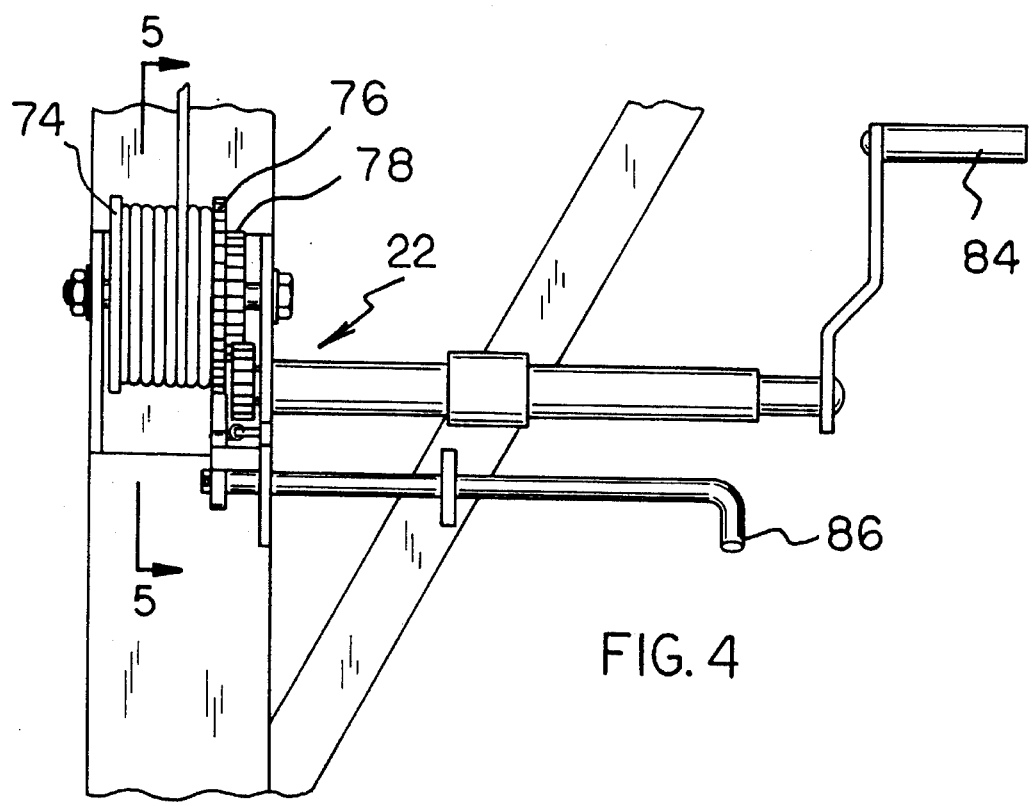
FIG. 4 is a plan view of the winch assembly in accordance with the first embodiment of the present invention.

With reference now to the drawings, and in particular to FIG. 1 thereof, a new and improved pivoting trailer assembly embodying the principles and concepts of the present invention and generally designated by the reference numeral 10 will be described.

The present invention relates to an assembly with pivoting mechanisms for the bed of a trailer assembly. The pivoting trailer assembly 10 includes in its simplest terms, a trailer frame 12 adapted to be connected to a towing vehicle, a pivoting trailer bed 14 and associated control mechanisms. The lifting assembly 10 of the present invention is designed to enable an operator to manually pivot the trailer bed relative to the frame by way of a winch. The lifting device includes a lifting ramp 18 connected to the frame, a lifting assembly 20 which rides upon the lifting ramp, and a winch assembly 22 which raises or lowers the lifting assembly.

The trailer frame 12 has a forward end, a rearward end, an upper portion, a lower portion, and a central region. The frame is of a conventional construction and is preferably constructed from steel. In order to conserve weight the frame is constructed from a number of steel beams. The beam construction of the frame provides great durability without the added weight which would result from a solid steel frame. Wheels 26 and an axle 28 serve to support the rearward end of the frame 12. The forward end 30 of the frame is adapted to be connected to a motor vehicle, or in the alternative rest upon the ground.

The trailer bed 14 has a forward end, a rearward end, an upper surface, and a lower surface. The rearward end of the trailer bed is pivotally connected to the rearward end of the trailer frame by appropriate hinge elements 34. The trailer bed 14 is of a width which is slightly greater than that of the trailer frame.

Furthermore, the lower surface of the trailer bed is recessed such that when the bed is not pivoted, the major extent of the frame fits within the recessed portion of the bed. The pivotal connection between the bed and the frame is accomplished by two depending side portions 36 of the trailer bed. The depending side portions are positioned at the rearward end of the bed and serve as the pivot points between the bed and frame.

The trailer frame 12 includes a lifting ramp 18 which has a forward end, a rearward end, an upper surface and a lower surface. The lifting ramp is connected with the trailer frame and extends along its central region. The ramp extends from the upper portion and forward end of the trailer frame to below the lower portion and rearward end of the trailer frame. The upper surface of the lifting ramp is formed with a recess 40 to enable it to securely receive the wheel 44 of the lifting assembly 20 as will be described hereafter.

The lifting assembly 20 is the component of the lifting device which actually raises or lowers the trailer bed 14. The lifting assembly includes a lifting arm 46. The lifting arm 46 includes an upper end and a lower end. A pivotal connection assembly 48 serves to connect the upper end of the arm and the lower surface of the trailer bed at its forward end. The pivotal connection assembly 48 will be described in greater detail hereafter. A wheel 44 is adapted to ride along the upper surface of the lifting ramp 18. The wheel 44 is connected to the lower end of the lifting arm 46. The wheel is of a thickness which allows it to ride within the recess 40 of the upper surface of the ramp. The lifting assembly 20 further includes a pulley arm having a forward end and a rearward end. The pulley arm 52 is connected to the lower end of the lifting arm 46. The pulley 54 is rotatably connected to the forward end of the pulley arm 52.

The pivotal connection 48 includes a U-Shaped bracket 60 which has two sides, an upper closed end, and a lower opened end. The upper closed end of the U-shaped bracket is connected to the lower surface and forward end of the trailer bed. An aperture is formed through the two sides of the U-shaped bracket and a bushing is positioned within the aperture. The upper end of the lifting arm 46 is connected to the bushing. A rod 62 which has a first end and a second end is positioned through the aperture of the U-shaped bracket and the bushing. Thus, the rod serves to pivotally connect the upper end of the lifting arm to the U-shaped bracket. In order to facilitate the pivotal connection between the U-shaped bracket and the rod a series of ball bearings 64 are positioned about each end of the rod 62.

A length of cord 68 with a first end and a second end is employed to operate the lifting assembly 20. The cord used should be of durable construction and be able to endure large tensile forces. A heavy gauge steel wire is envisioned as suiting the aforementioned requirements. The first end of the cord is anchored to the forward end of the lifting ramp by an eyelet 70. The second end of the cord 68 is connected to the winch assembly 22. The connection between the second end of the cord and the winch assembly will be described in greater detail hereafter. The pulley 54 of the lifting assembly is adapted to ride along the length of cord intermediate the first and second ends. Thus, the length of cord provides the interconnection between the winch assembly 22 and the lifting assembly 20.

Figure 5:
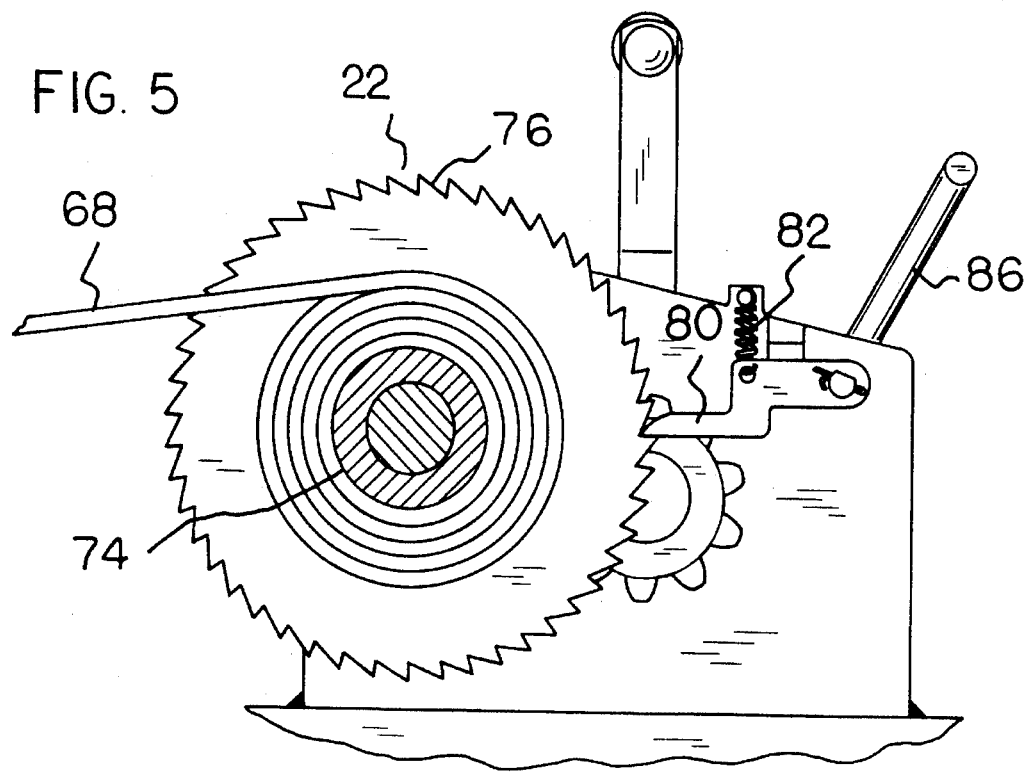
FIG. 5 is an elevational view taken along the line 5—5 of FIG. 4.
Figure 6:
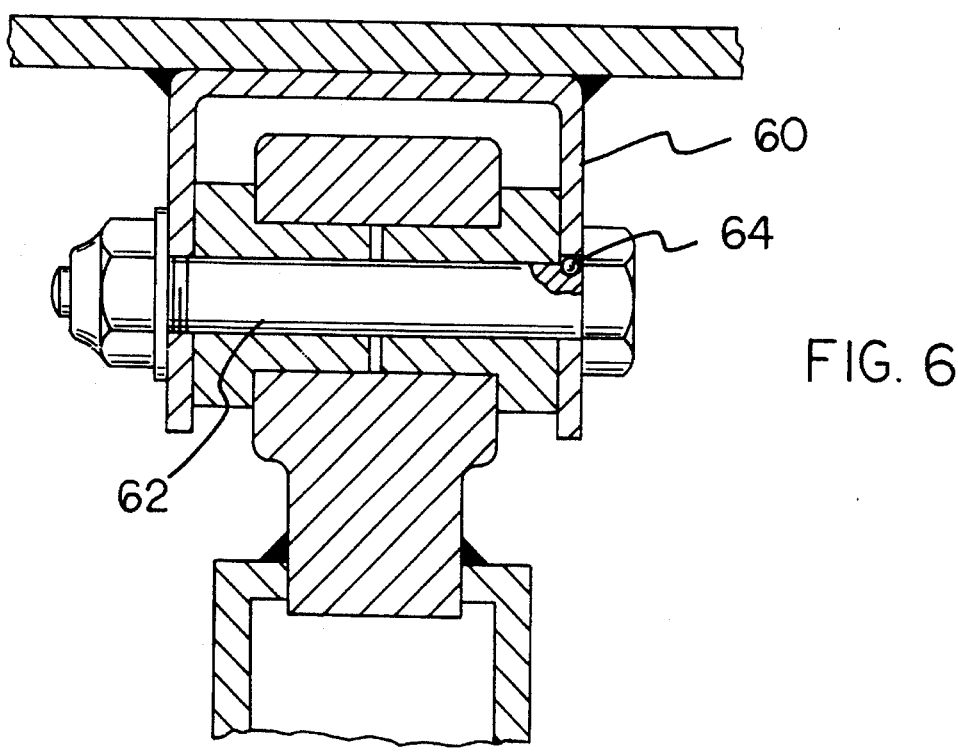
FIG. 6 is a sectional view of the upper end of the lifting arm in accordance with the present invention.

The winch assembly 22 is positioned at the forward end of the trailer frame. The winch assembly includes a spool 74 having a first end with a first peripheral edge and a second end with a second peripheral edge. A set of saw teeth 76 are positioned about at least one of the peripheral edges of the spool. Furthermore, a driving gear 78 is connected to the end of the spool adjacent the set of saw teeth. The winch assembly further includes a latch 80 with a biasing spring 82. The latch can be positioned in one of two orientations. The first position as shown in FIG. 5 is in engagement with the set of saw teeth. The second position is one of disengagement from the set of saw teeth. A first handle means 86 is employed to position the spring biased latch 80 in one of its two positions. As is apparent from the Figures, when the spring biased latch is in its first position rotation of the spool is permitted only in the direction which winds the cord about the spool. When the cord is wound about the spool the pulley and the lifting arm are pulled to the forward portion of the lifting ramp.

In operation, when the bed is in the unpivoted orientation, the trailer assembly can be employed like a conventional trailer assembly. The trailer can be pulled by a vehicle from one location to another. The present invention does not become apparent until the operator wishes to pivot the trailer bed relative to the trailer frame. The operator pivots the trailer bed 14 in the following manner. First, the first handle means 86 is rotated to ensure that the spring biased latch is in its first or locked orientation. Then, a second handle means 84 is rotated. Rotation of the second handle means rotates the driving gear and, in turn, the spool 74 of the winch assembly. Due to the latch being in its first orientation, rotation of the second handle means and thus the spool is permitted only in one direction. This direction is such that the cord 68 is wound about the outer surface of the spool 74. Taking up the length of the cord about the spool serves to pull the pulley 54 and the wheel 44 of the lifting assembly 20 up the lifting ramp 18. As will be apparent, pulling the wheel towards the forward end of the lifting ramp moves the lifting arm 46 from a position originally parallel to the trailer bed to a final position perpendicular to the trailer bed. When the lifting arm is perpendicular to the trailer bed, the trailer bed is at its greatest pivoted position. For lowering the pivotal ramp to the horizontal orientation, these steps are reversed.

The second embodiment of the present invention is substantially the same as that of the first. Note FIGS. 7 and 8. The second embodiment of the present invention removes the need for any handle means and thus the need for any manual labor. The second embodiment includes a means 82 for routing power from the towing vehicle to the winch assembly 84. The means can take the form of a conventional wiring system. The second embodiment further includes means for employing the power from the towing vehicle to rotate the spool 86 of the winch assembly. Lastly, the second embodiment includes a switch 88 having a first position allowing power to be transferred from the towing vehicle to the winch assembly and a second position preventing the transfer of power between the towing vehicle and the winch assembly.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer assembly comprising, in combination:
   a trailer frame having a forward end, a rearward end, an upper portion, a lower portion, and a central region;
   a trailer bed having a forward end, an upper surface, and a lower surface, the rearward end of the trailer bed being pivotally connected to the rearward end of the trailer frame to enable the trailer bed to pivot with respect to the horizontal;
   a lifting ramp having a forward end, a rearward end, an upper surface and a lower surface, the lifting ramp being connected with the trailer frame, the lifting ramp extending along the central region of the trailer frame from the upper portion and forward end of the trailer frame to below the lower portion and rearward end of the trailer frame;
   a lifting assembly including a lifting arm, the lifting arm having an upper end and a lower end, a pivotal connection assembly connecting the upper end of the arm and the lower surface of the trailer bed at its forward end, a wheel connected to the lower end of the lifting arm, the wheel adapted to ride along the upper surface of the lifting ramp, a pulley arm having a forward end and a rearward end, the pulley arm connected to the lower end of the lifting arm and a pulley connected to the forward end of the pulley arm;
   the pivotal connection assembly including a U-shaped bracket having two sides, an upper closed end, and a lower opened end, the upper closed end of the U-shaped bracket connected to the lower surface and forward end of the trailer bed, an aperture formed through the two sides of the U-shaped bracket, the upper end of the lifting arm being connected to the bushing, a rod having a first end and a second end, the rod positioned through the aperture of the U-shaped bracket and the bushing, the rod serving to pivotally connect the upper end of the lifting arm to the U-shaped bracket, a series of ball bearings positioned about each end of the rod, the ball bearings aiding the pivotal connection between the lifting arm and U-shaped bracket;
   a cord having a first end and a second end, the first end being anchored to the forward end of the lifting ramp, the pulley adapted to ride along the length of the cord intermediate the first and second ends;
   a winch assembly positioned at the forward end of the trailer frame, the winch assembly having a spool, the spool having a first end with a first peripheral edge and a second end with a second peripheral edge, a set of saw teeth positioned about at least one of the peripheral edges of the spool, a driving gear connected to an end of the spool adjacent the set of saw teeth, the winch assembly further including a latch with a spring biasing the latch into a first position in engagement with the set of saw teeth, the latch having a second position in disengagement from the set of teeth, a first handle means serving to rotate the driving gear and spool, a second handle means serving to position the spring biased latch in one of its two positions, the second end of the cord being attached to the spool whereby when the spring biased latch is in the first position rotation of the spool pulls the pulley and lifting arm to the forward end of the lifting ramp.

2. A trailer assembly comprising:
   a trailer frame, the trailer frame adapted to be connected to a towing vehicle at its forward end;
   a trailer bed, the rearward end of the trailer bed being pivotally connected to the rearward end of the trailer frame to enable the trailer bed to pivot with respect to the horizontal;
   a lifting ramp coupled to the trailer frame, the lifting ramp extending along the trailer frame and having a forward end;
   a lifting assembly including a lifting arm having upper and lower ends, a pivotal connection assembly connecting the upper end of the arm and the trailer bed at its forward end, a wheel connected to the lower end of the lifting arm, the wheel adapted to ride along an upper surface of the lifting ramp, a pulley arm coupled to the lower end of the lifting arm with a pulley connected to a forward end of the pulley arm;
   a cord having a first end anchored to the forward end of the lifting ramp and a second end, the pulley adapted to ride along the length of the cord intermediate its ends; and a winch assembly positioned at the forward end of the trailer frame, the winch assembly having a spool with a first end with a first peripheral edge and a second end with a second peripheral edge, the second end of the cord coupled to the spool.

3. The trailer assembly as set forth in claim 2 and further including:
   a crank for manually operating the winch assembly.

4. The trailer assembly of claim 2 further comprising:
   means for transferring power from the towing vehicle to the winch assembly;
   means for employing the power from the towing vehicle to rotate the spool of the winch assembly; and
   a switch having a first position allowing power to be transferred from the towing vehicle to the winch assembly, and a second position preventing power transfer from the towing vehicle to the winch assembly.

* * * * *